United States Patent
Kumar et al.

(10) Patent No.: US 10,389,757 B2
(45) Date of Patent: Aug. 20, 2019

(54) RULE PLACEMENT IN NETWORK DEVICES

(71) Applicant: Juniper Networks, Inc., Sunnyvale, CA (US)

(72) Inventors: Chandan Kumar, Bangalore (IN); Mayank Betala, Bangalore (IN); Nadeem Khan, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 203 days.

(21) Appl. No.: 15/476,121

(22) Filed: Mar. 31, 2017

(65) Prior Publication Data
US 2018/0176257 A1    Jun. 21, 2018

(30) Foreign Application Priority Data
Dec. 15, 2016   (IN) .............................. 201641042725

(51) Int. Cl.
*H04L 29/06* (2006.01)
*G06N 3/08* (2006.01)
*G06N 20/00* (2019.01)

(52) U.S. Cl.
CPC .............. *H04L 63/20* (2013.01); *G06N 3/08* (2013.01); *G06N 20/00* (2019.01); *H04L 63/0263* (2013.01)

(58) Field of Classification Search
None
See application file for complete search history.

(56) References Cited

U.S. PATENT DOCUMENTS

| 6,577,597 B1* | 6/2003 | Natarajan | H04L 12/2854 370/232 |
| 8,429,255 B1* | 4/2013 | Khan | H04L 47/10 709/220 |

OTHER PUBLICATIONS

Al-Shaer et al., "Discovery of Policy Anomalies in Distributed Firewalls," https://www.utdallas.edu/~bxt043000/Publications/Conference-Papers/Das/C70_Detection_and_Resolution_of_Anomalies_in_Firewall_Policy_Rules.pdf, Mar. 2004, 16 pages.
Chaure, "An Implementation of Anomaly Detection Mechanism for Centralized and Distributed Firewalls," http://citeseerx.ist.psu.edu/viewdoc/download?rep=rep1&type=pdf&doi=10.1.1.206.3133, Sep. 2010, 4 pages.
Zhang et al., "An Adaptable Rule Placement for Software-Defined Networks," https://www.researchgate.net/publication/268810261_An_Adaptable_Rule_Placement_for_Software-Defined_Networks, Jun. 2014, 13 pages.

* cited by examiner

*Primary Examiner* — Yogesh Paliwal
*Assistant Examiner* — Hassan Saadoun
(74) *Attorney, Agent, or Firm* — Harrity & Harrity, LLP

(57) ABSTRACT

A device receives a new rule construct that includes a source address or a destination address, and at least one parameter, where the new rule construct includes a new rule to be provided to a network. The device identifies network devices, of the network, to which the new rule is to be provided based on the new rule construct, and determines a proper position for the new rule, in a list of existing rules provided in each network device, based on the new rule construct and information associated with the network devices. The device causes the new rule to be provided to and stored in the network devices, at the proper position, in the list of existing rules, determined for each network device.

20 Claims, 12 Drawing Sheets

US 10,389,757 B2

RULE PLACEMENT IN NETWORK DEVICES

RELATED APPLICATION

This application claims priority under 35 U.S.C. § 119 based on Indian Provisional Patent Application No. 201641042725, filed Dec. 15, 2016, the disclosure of which is incorporated by reference herein in its entirety.

BACKGROUND

A network device, such as a firewall, is a device that acts as an interface between a network and one or more external devices and/or networks. A firewall implements a security policy of a network by determining which traffic (e.g., packets) to let pass through and which traffic to block, based on a set of rules defined by a network administrator. Any error in defining the rules may compromise network security by letting undesired traffic pass through or by blocking desired traffic. The firewall rules, when defined manually, often result in a set that contains conflicting, redundant, or overshadowed firewall rules, which creates anomalies in the firewall policy.

SUMMARY

According to some possible implementations, a device may include one or more processors to receive a new rule construct that includes a source address, a destination address, and one or more parameters, where the new rule construct may include a new rule to be provided to a network with a plurality of network devices. The one or more processors may identify a set of network devices, of the plurality of network devices, to which the new rule is to be provided based on the new rule construct, and may determine a proper position for the new rule, in a list of existing rules provided in each network device of the set of network devices, based on the new rule construct and information associated with the set of network devices. The one or more processors may cause the new rule to be provided to and stored in the set of network devices at the proper position, in the list of existing rules, determined for each network device of the set of network devices.

According to some possible implementations, a non-transitory computer-readable medium may store one or more instructions that, when executed by one or more processors, cause the one or more processors to receive a new rule construct that includes a source address or a destination address, and at least one parameter, where the new rule construct may include a new rule to be provided to a network. The one or more instructions may further cause the one or more processors to identify a plurality of network devices, of the network, to which the new rule is to be provided based on the new rule construct, and determine a proper position for the new rule, in a list of existing rules provided in each network device of the plurality of network devices, based on the new rule construct and information associated with the plurality of network devices. The one or more instructions may cause the one or more processors to cause the new rule to be provided to and stored in the plurality of network devices at the proper position, in the list of existing rules, determined for each network device of the plurality of network devices.

According to some possible implementations, a method may include receiving, by a device, a new rule construct that includes a source address or a destination address, and at least one parameter, the new rule construct including a new rule to be provided to a network, and identifying, by the device, a plurality of network devices, of the network, to which the new rule is to be provided based on the new rule construct. The method may further include determining, by the device, a proper position for the new rule, in a list of existing rules provided in each network device of the plurality of network devices, based on the new rule construct and information associated with the plurality of network devices, and causing, by the device, the new rule to be provided to and stored in the plurality of network devices at the proper position, in the list of existing rules, determined for each network device of the plurality of network devices.

DETAILED DESCRIPTION

The following detailed description of example implementations refers to the accompanying drawings. The same reference numbers in different drawings may identify the same or similar elements.

Firewall rules management is an important aspect of any security management solution. Typically, network administrators create a firewall rule by manually assigning required source and destination addresses along with other necessary rule constructs. A position or placement of a firewall rule (e.g., in a list of firewall rules) plays an important role as the firewall rules are evaluated in sequence by firewalls. So network administrators need to find a proper position for a new firewall rule in order to avoid shadowing and redundancy of firewall rules. For this, network administrators use a search functionality to check if a same address, for a new firewall rule, is used in any of the existing firewall rules. Such manual tasks by network administrators are time consuming since a network may include a large number of firewalls storing a large number of firewall rules. Furthermore, the search functionality wastes computing resources by locating and checking existing firewall rules. The manual entry by the network administrator is prone to human error and subjective, which leads to incorrect firewall rule placement. Incorrect firewall rule placement introduces errors into the firewalls and, thus, wastes computing resources of the firewalls and reduces the performance of the firewalls.

Implementations, described herein, may provide a controller device that automatically analyzes existing firewall rules associated with multiple network devices (e.g., firewall devices), causes a new firewall rule to be stored at a proper position within a list of firewall rules, in the multiple network devices, based on the analysis of the existing firewall rules, and creates an intent-based firewall policy. The controller device may receive (e.g., from a network administrator) a source address, a destination address, one or more other parameters (e.g., information associated with a threat management policy, a denial of service policy, etc.) in a new firewall rule construct, and information identifying network devices (e.g., firewall devices) to which the new firewall rule is to be provided. The controller device may utilize the new firewall rule construct and the information identifying the network devices to determine a proper position for the new firewall rule in a list of firewall rules, and may cause the new firewall rule to be stored in the network devices at the proper position in the list of firewall rules. The controller device may determine proper positions for new firewall rules more quickly than typical systems that do not use the controller device, which may conserve computing resources of the controller device, as well as computing resources of the multiple network devices.

Figure 1A:
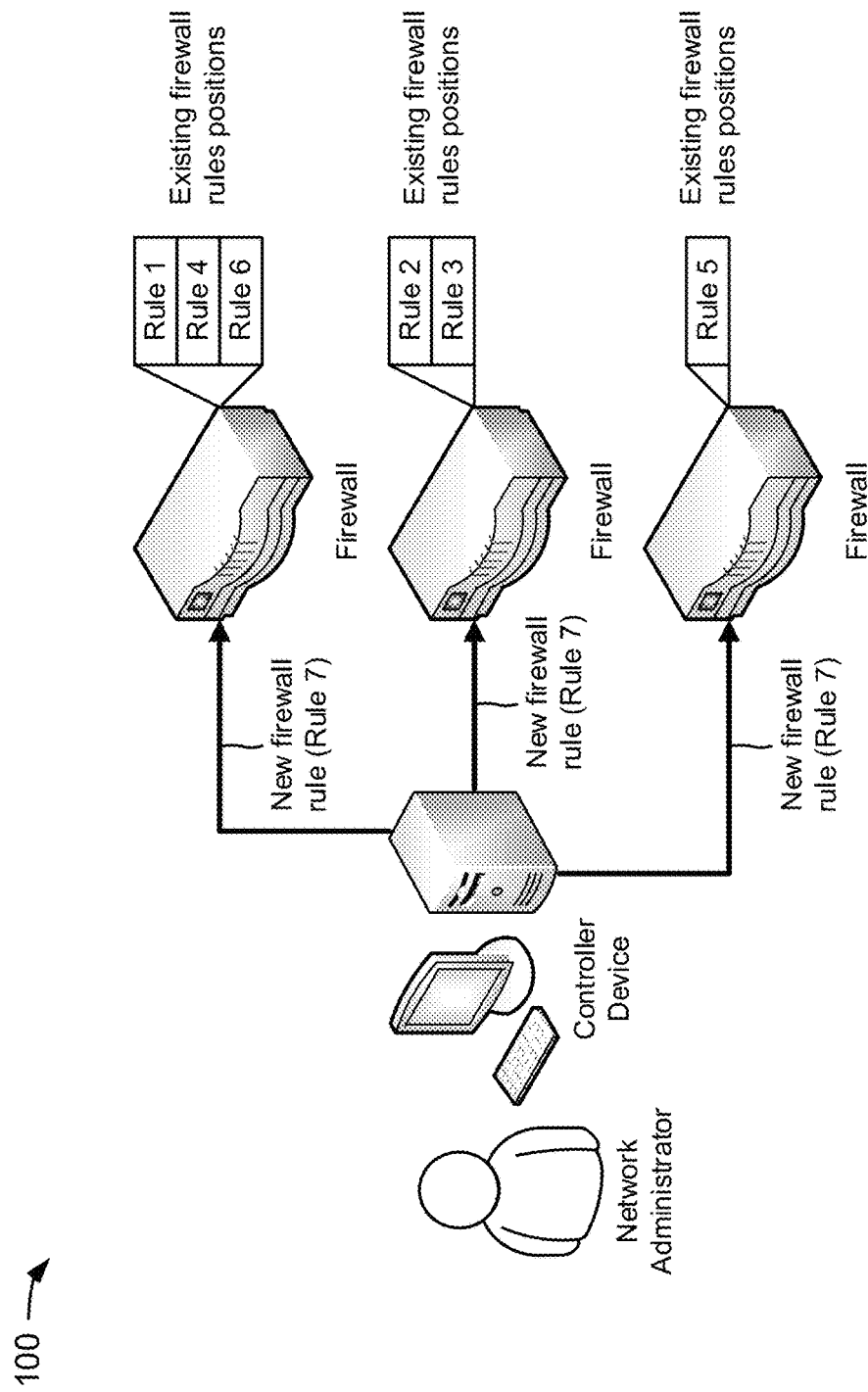
FIGS. 1A and 1B are diagrams of an overview of an example implementation described herein.
Figure 1B:
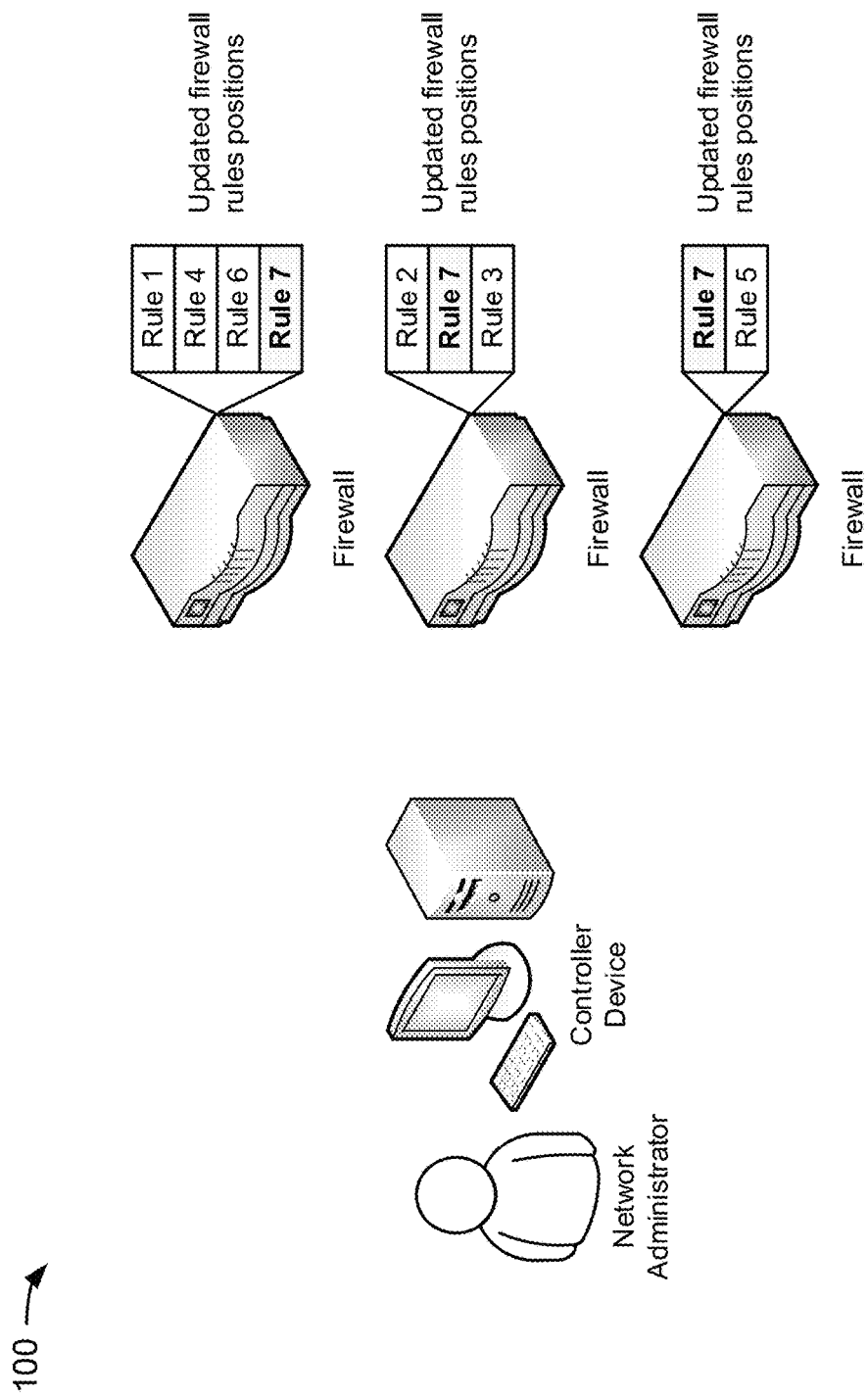

FIGS. 1A and 1B are diagrams of an overview of an example implementation 100 described herein. With reference to FIG. 1A, assume that a controller device receives (e.g., from a network administrator) a source address, a destination address, and one or more parameters (e.g., information associated with a threat management policy, a denial of service policy, etc.) in a new rule construct (e.g., for a new firewall rule, Rule 7), and information identifying network devices (e.g., firewall devices) to which the new firewall rule is to be provided. In some implementations, the controller device may determine the firewall devices to which the new firewall rule is to be provided based on the new rule construct. Further, assume that a first firewall device includes existing firewall rules provided in a first particular order (e.g., Rule 1, Rule 4, and Rule 6), a second firewall device includes existing firewall rules provided in a second particular order (e.g., Rule 2 and Rule 3), and a third firewall device includes one existing firewall rule (e.g., Rule 5).

The controller device may utilize the new rule construct and the information identifying the firewall devices to determine proper positions for the new firewall rule (e.g., in a list of firewall rules in a memory of each of the firewall devices), and may cause the new firewall rule to be stored in the firewall devices at the proper positions, as described below. For example, as shown in FIG. 1B, the controller device may cause the first firewall device to store the new firewall rule after Rule 6, may cause the second firewall device to store the new firewall rule between Rule 2 and Rule 3, and may cause the third firewall device to store the new firewall rule prior to Rule 5.

Unlike manual determination of firewall rule placement by network administrators and typical automated firewall rule placement systems, the controller device may determine proper positions for new firewall rules more quickly, which may conserve computing resources of the controller device, as well as computing resources of network devices (e.g., firewall devices). Furthermore, the controller device may utilize a source address or a destination address, and policy information (e.g., information associated with a threat management policy, a denial of service policy, etc.), to automatically identify network devices to which the new rule is to be provided and to properly place the new rule in each of the identified network devices.

As indicated above, FIGS. 1A and 1B are provided merely as an example. Other examples are possible and may differ from what was described with regard to FIGS. 1A and 1B.

Figure 2:
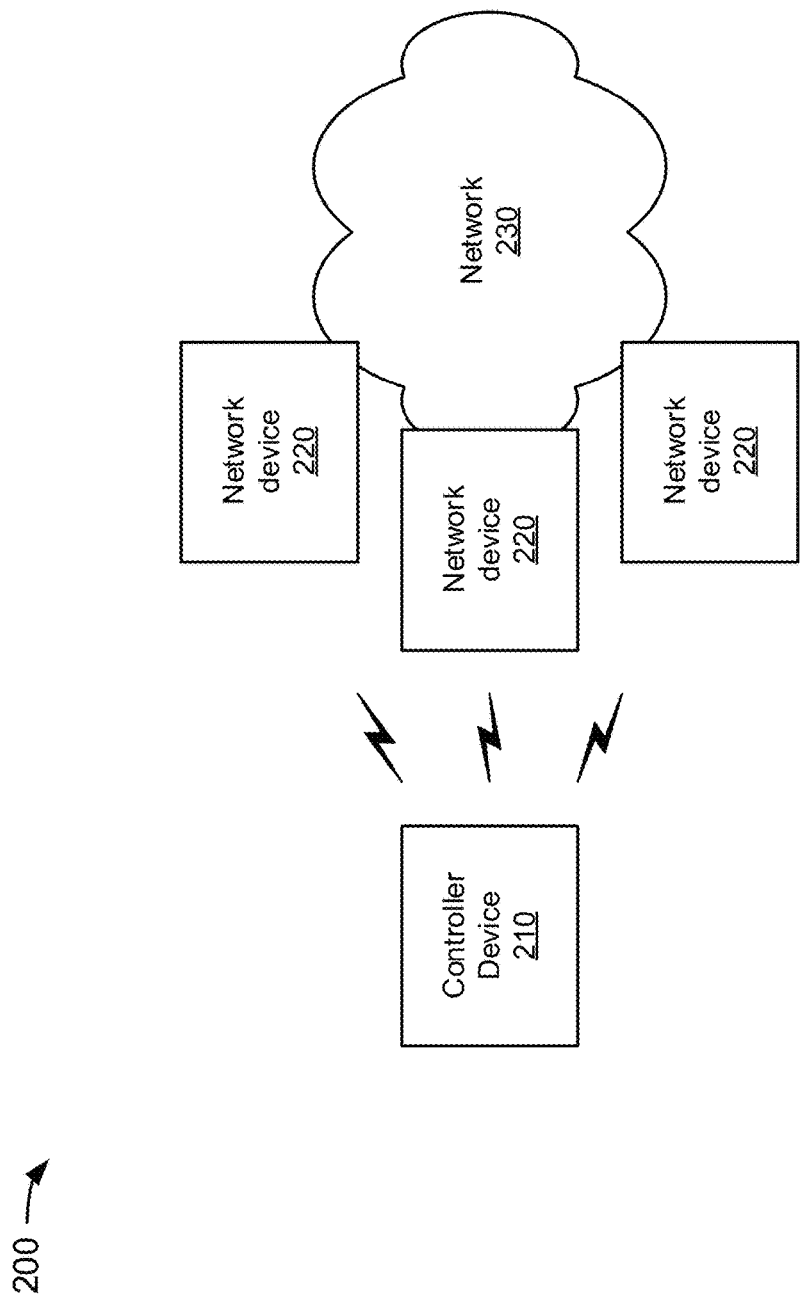
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include a controller device 210, multiple network devices 220, and a network 230. Devices of environment 200 may interconnect via wired connections, wireless connections, or a combination of wired and wireless connections.

Controller device 210 includes one or more devices capable of receiving, generating, storing, processing, and/or providing information, such as information described herein. For example, controller device 210 may include a computing device, such as a server device, a group of server devices, one or more virtual machines executing on one or more computing devices in a cloud computing environment, one or more computing devices in a cloud computing environment, or the like. In some implementations, controller device 210 may receive information from and/or transmit information to network devices 220.

Network device 220 includes a device capable of receiving, transmitting, processing, routing, or the like, information (e.g., packets) via network 230. In implementations described herein, network device 220 may correspond to a firewall device or may execute firewall software to perform firewall functionality. In some implementations, network device 220 may include a router, a switch, a gateway, a modem, a network interface controller (NIC), a hub, a bridge, a proxy server, an optical add-drop multiplexer (OADM), one or more virtual machines executing on one or more computing devices in a cloud computing environment, one or more computing devices in a cloud computing environment, or another type of network device. In some implementations, network device 220 may include one or more input ports associated with receiving packets and one or more output ports associated with transmitting packets. In some implementations, network device 220 may be connected to one or more other network devices 220. In some implementations, network device 220 may communicate with other devices (not shown) in order to process and/or route packets received by network device 220.

In some implementations, controller device 210 may be associated with and control tens, hundreds, or thousands of network devices 220. In some implementations, each network device 220 may be associated with (e.g., store) tens, hundreds, thousands, or millions of rules.

Network 230 includes one or more wired and/or wireless networks. For example, network 230 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
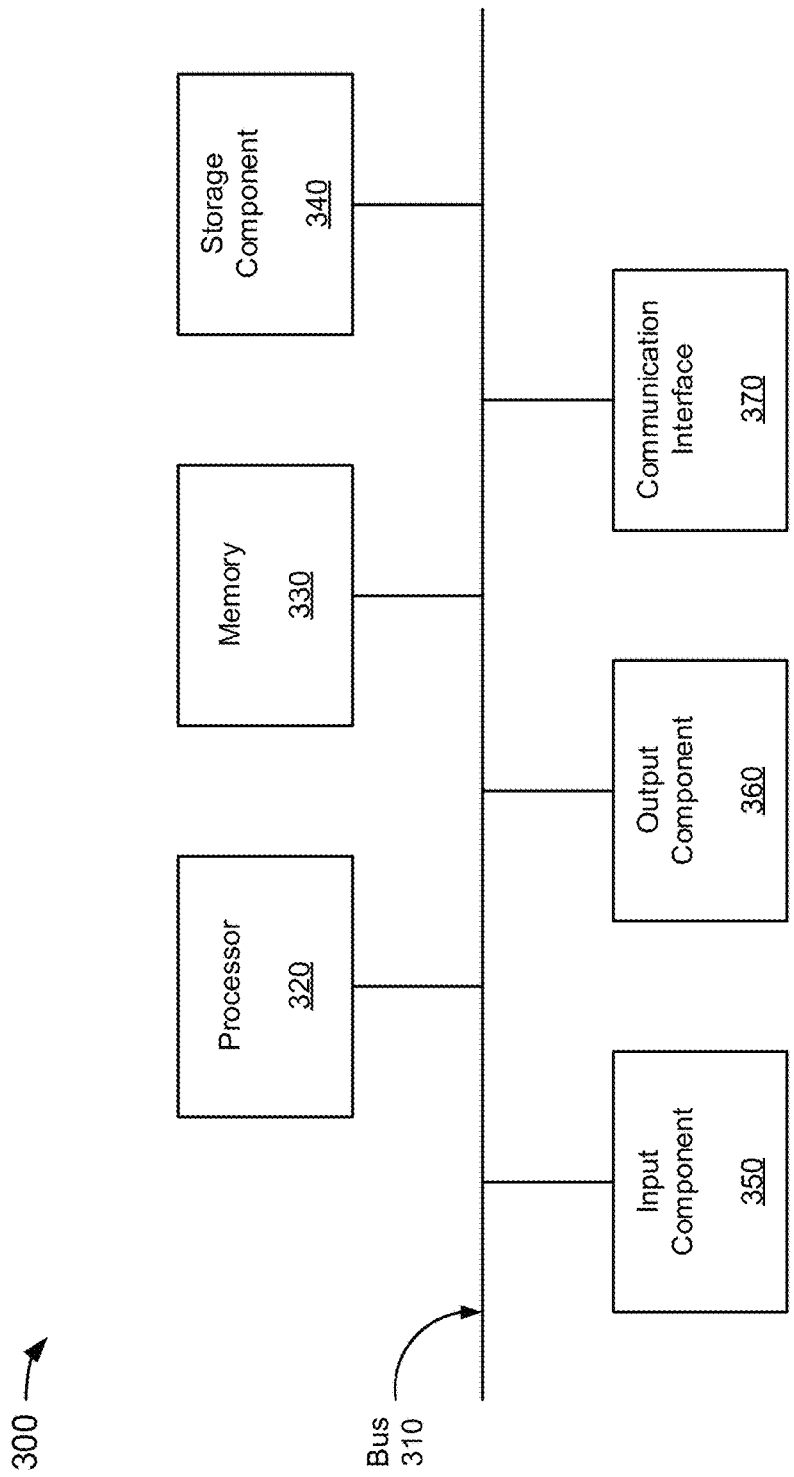
FIG. 3 is a diagram of example components of one or more devices of FIG. 2.

FIG. 3 is a diagram of example components of a device 300. Device 300 may correspond to controller device 210. In some implementations, controller device 210 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processor. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 includes a component that provides output information from device 300 (e.g., a display, a speaker, one or more light-emitting diodes (LEDs), etc.).

Communication interface 370 includes a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
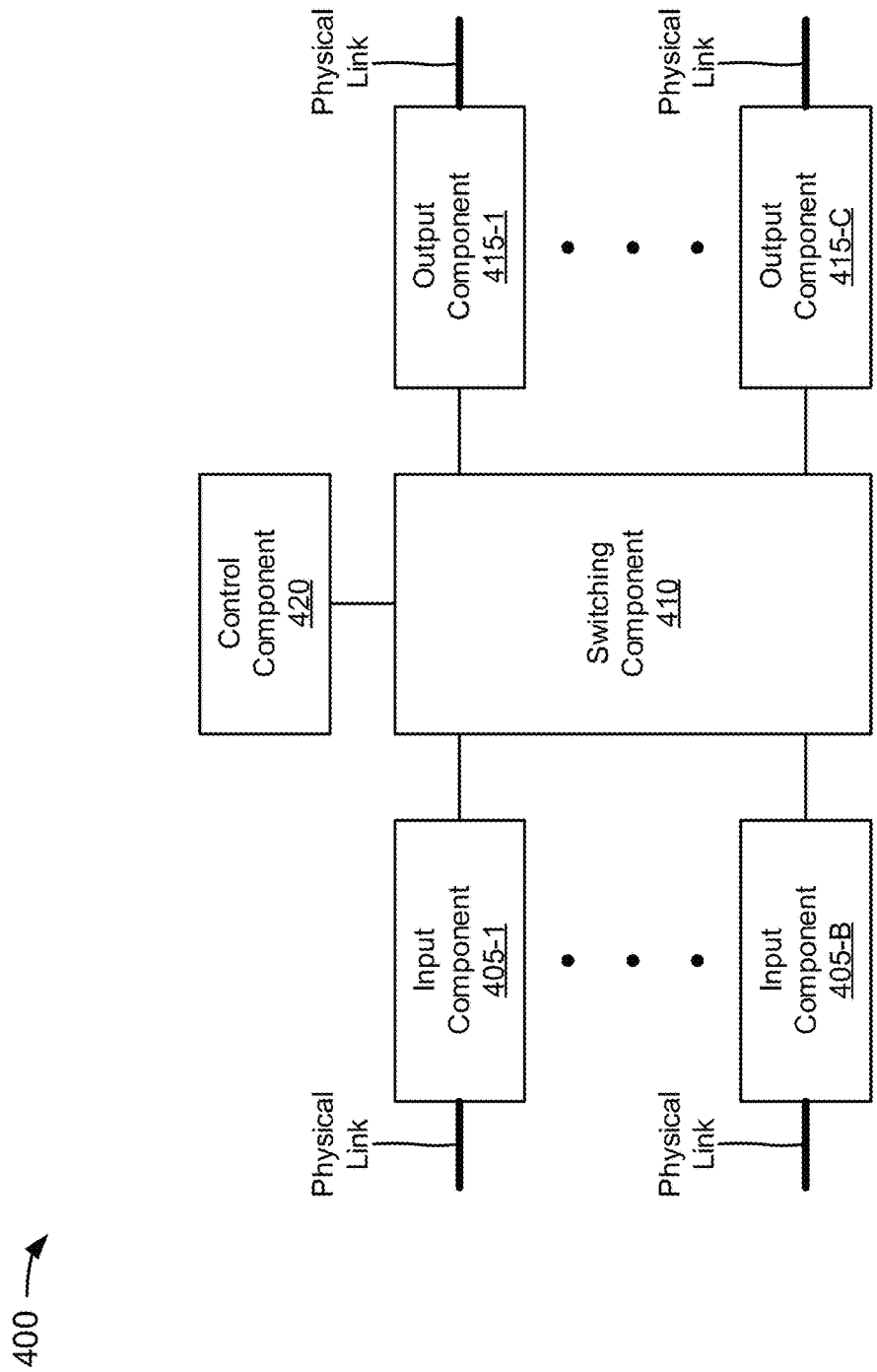
FIG. 4 is a diagram of example components of a network device of FIG. 2.

FIG. 4 is a diagram of example components of a device 400. Device 400 may correspond to network device 220. As shown in FIG. 4, device 400 may include one or more input components 405-1 through 405-B (B≥1) (hereinafter referred to collectively as input components 405, and individually as input component 405), a switching component 410, one or more output components 415-1 through 415-C (C≥1) (hereinafter referred to collectively as output components 415, and individually as output component 415), and a control component 420.

Input component 405 may be a point of attachment for a physical link and may be a point of entry for incoming traffic, such as packets. Input component 405 may process incoming traffic, such as by performing data link layer encapsulation or decapsulation. In some implementations, input component 405 may send and/or receive packets. In some implementations, input component 405 may include an input line card that includes one or more packet processing components (e.g., in the form of integrated circuits), such as one or more interface cards (IFCs), packet forwarding components, line card controller components, input ports, processors, memories, and/or input queues.

Switching component 410 may interconnect input components 405 with output components 415. In some implementations, switching component 410 may be implemented via one or more crossbars, via one or more busses, and/or with one or more shared memories. The shared memories may act as temporary buffers to store packets from input components 405 before the packets are eventually scheduled for delivery to output components 415. In some implementations, switching component 410 may enable input components 405, output components 415, and/or control component 420 to communicate.

Output component 415 may be a point of attachment for a physical link and may be a point of exit for outgoing traffic, such as packets. Output component 415 may store packets and may schedule packets for transmission on output physical links. Output component 415 may support data link layer encapsulation or decapsulation, and/or a variety of higher-level protocols. In some implementations, output component 415 may send packets and/or receive packets. In some implementations, output component 415 may include an output line card that includes one or more packet processing components (e.g., in the form of integrated circuits), such as one or more IFCs, packet forwarding components, line card controller components, output ports, processors, memories, and/or output queues. In some implementations, input component 405 and output component 415 may be implemented by the same set of components (e.g., an input/output component may be a combination of input component 405 and output component 415).

Control component 420 includes a processor in the form of, for example, a CPU, a GPU, an APU, a microprocessor, a microcontroller, a DSP, an FPGA, an ASIC, or another type of processor. The processor is implemented in hardware, firmware, or a combination of hardware and software. In some implementations, control component 420 may include one or more processors that can be programmed to perform a function. In some implementations, control component 420 may include a random access memory (RAM), a read only memory (ROM), and/or another type of dynamic or static storage device (e.g., a flash memory, a magnetic memory, an optical memory, etc.) that stores information and/or instructions.

In some implementations, input component 405, switching component 410, and/or output component 415 may include one or more processors in the form of, for example, a CPU, a GPU, an APU, a microprocessor, a microcontroller, a DSP, an FPGA, an ASIC, or another type of processor; and/or RAM, ROM, and/or another type of dynamic or static storage device.

In some implementations, control component 420 may communicate with other devices, networks, and/or systems connected to device 400 to exchange information regarding network topology. Control component 420 may create routing tables based on the network topology information, create forwarding tables based on the routing tables, and provide the forwarding tables to input components 405 and/or output components 415. Input components 405 and/or output components 415 may use the forwarding tables to perform route lookups for incoming and/or outgoing packets.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
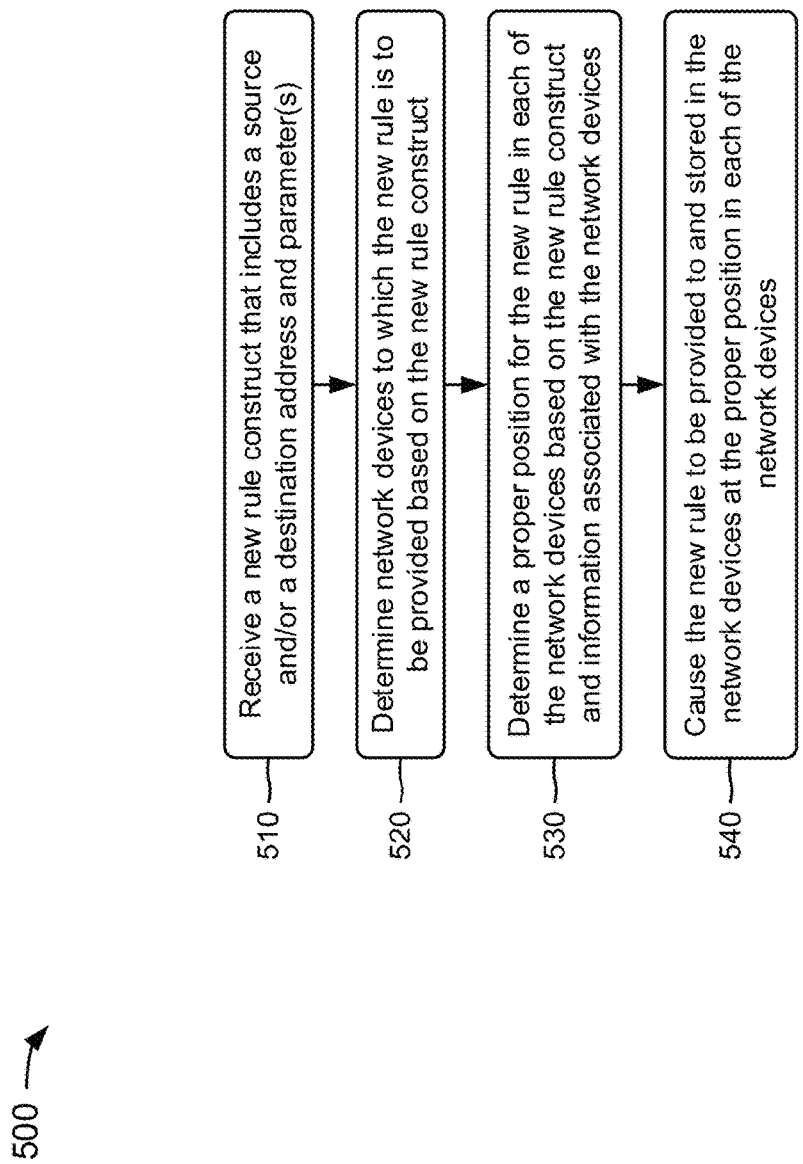
FIG. 5 is a flow chart of an example process for causing a new rule to be provided to one or more network devices.

FIG. 5 is a flow chart of an example process 500 for causing a new rule to be provided to one or more network devices 220. In some implementations, one or more process blocks of FIG. 5 may be performed by controller device 210. In some implementations, one or more process blocks of FIG. 5 may be performed by another device or a group of devices separate from or including controller device 210.

As shown in FIG. 5, process 500 may include receiving a new rule construct that includes a source and/or destination address and one or more parameters (block 510). For example, a network administrator may provide a new rule construct to controller device 210, and controller device 210 may receive the new rule construct. In some implementations, controller device 210 may store the new rule construct in memory (e.g., in memory 330 and/or storage component 340). In some implementations, the new rule construct may include a source address or a destination address, both the source address and the destination address, and/or one or more parameters. In some implementations, the one or more parameters may include information associated with firewall policies, such as, for example, a threat management policy, a denial of service policy, a network address translation (NAT) policy, a quality of service (QoS) policy, a decryption policy, an application override policy, or the like. In some implementations, the information associated with the firewall policies may include one or more rules for implementing each of the firewall policies.

In some implementations, the new rule construct may include a set of rule elements against which packet characteristics are compared. The set of rule elements, which may be displayed as fields in the new rule construct, may include a field for a packet's source zone (e.g., a grouping of interfaces that are similar from a security perspective), a field for the packet's source address, a field for the packet's destination zone, a field for the packet's destination address, a field for the packet's service (e.g., protocol and port identifier), a field for an action to be performed on the packet (e.g., permit, deny, or the like), and a field for advanced security policies to apply to the packet (e.g., an administrative approval mode (AAM) security policy, a security intelligence (SecIntel) security policy, a denial of service policy, or the like).

For example, the new rule construct may include the following information:

| Source Zone | Source Address | Destination Zone | Destination Address | Service | Action | Advanced Security |
|---|---|---|---|---|---|---|
| Any | PEG | Internet | Any | Any | Permit | AAM Policy/ SecIntel Policy |

In this example, the source zone field, the destination address field, and the service field may be designated as "Any," which may indicate that the new rule will apply to a packet associated with any source zone, any destination address, and any service. The source address field may be designated as "policy enforcement group (PEG)," which may include a list of Internet protocol (IP) addresses. The destination zone field may be designated as "Internet," which may indicate that the new rule will apply to a packet with the Internet as a destination zone. The action field may be designated as "Permit," which may indicate that the new rule will permit a packet, with a PEG as a source address and the Internet as a destination zone, to be forwarded. The advanced security field may be designated as "AAM Policy/ SecIntel Policy," which may indicate that the new rule will apply an AAM security policy and a SecIntel security policy to the packet.

As further shown in FIG. 5, process 500 may include determining network devices to which the new rule is to be provided based on the new rule construct (block 520). For example, controller device 210 may determine network devices 220 to which the new rule is to be provided based on the new rule construct. In some implementations, controller device 210 may receive (e.g., from a network administrator) information identifying network devices 220 to which the new rule is to be provided, and may determine network devices 220 to which the new rule is to be provided based on the information identifying network devices 220. For example, the network administrator may provide, to controller device 210, information identifying a set of network devices 220 to which the new rule is to be provided. Based on the information identifying the set of network devices 220, controller device 210 may determine that the new rule is to be provided to one or more network devices 220 of the set of network devices 220 (e.g., assuming there is no conflict between the new rule and existing rules in the one or more network devices 220).

In some implementations, controller device 210 may automatically discover information associated with network devices 220, and may utilize such information to determine, based on the new rule construct, network devices 220 to which the new rule is to be provided. In some implementations, controller device 210 may utilize one or more techniques to determine, based on the new rule construct, network devices 220 to which the new rule is to be provided. For example, controller device 210 may utilize a machine learning technique, an artificial intelligence technique, a data mining technique, a modeling technique, a neural network technique, another type of big data technique, or a combination of two or more of these techniques to determine network devices 220 to which the new rule is to be provided. In such an example, controller device 210 may utilize the one or more techniques to compare information provided in the new rule construct and network device information associated with network devices 220. The network device information may include, for example, information associated with existing rules stored on network devices 220. Based on the comparison of the information provided in the new rule construct and the network device information, controller device 210 may determine network devices 220 to which the new rule is to be provided. Furthermore, the comparison of the information provided in the new rule construct and the network device information is a big data problem since network 230 may include tens, hundreds, or thousands of network devices 220, and each network device 220 may be associated with (e.g., store) tens, hundreds, thousands, or millions of rules.

The machine learning technique may include, for example, algorithms that can change based on new data. The machine learning technique may search through data to detect patterns in the data, and may adjust actions of the machine learning algorithm based on the detected patterns. Machine learning algorithms may be categorized as being supervised or unsupervised. Supervised machine learning algorithms may apply what has been learned in the past to new data, and unsupervised machine learning algorithms may draw inferences from data.

The artificial intelligence technique may include, for example, a simulation of human intelligence processes by computers. The processes may include learning (e.g., the acquisition of information and rules for using the information), reasoning (e.g., using the rules to reach approximate or definite conclusions), and self-correction. The artificial intelligence technique may perform tasks, such as identifying patterns in data, more efficiently and accurately than humans, and, when presented with an unfamiliar task, may include enough intelligence to find a solution to the task.

The data mining technique may include, for example, sorting through data to identify patterns and establish relationships. Parameters of the data mining technique may include association (e.g., searching for patterns where one event is connected to another event); sequence or path analysis (e.g., searching for patterns where one event leads to another later event); classification (e.g., searching for new patterns in data, which may result in a change in the way the data is organized); clustering (e.g., determining and documenting groups of facts not previously known); and forecasting (e.g., discovering patterns in data that can lead to reasonable predictions about the future, which is also known as predictive analytics).

The modeling technique may include, for example, modeling data to resolve complex relationships among the data, to define and categorize the data, and to establish standard definitions and descriptors so that the data may be utilized by other systems.

The neural network technique may include, for example, a system of hardware and/or software patterned after the operation of neurons in the human brain. The neural network technique may solve complex problems, such as pattern recognition problems. The neural network may be initially trained based on large amounts of data. The training may include providing an input to the neural network, and informing the neural network what should be the output.

Once controller device 210 determines the particular network devices 220 to which the new rule is to be provided, controller device 210 may store information identifying the particular network devices 220 (e.g., in memory 330 and/or storage component 340)

As further shown in FIG. 5, process 500 may include determining a proper position for the new rule in each of the network devices based on the new rule construct and information associated with the network devices (block 530). For example, controller device 210 may determine a proper position for the new rule in each of network devices 220 (e.g., to which the new rule is to be provided, as determined by controller device 210) based on the new rule construct and information associated with network devices 220. In some implementations, controller device 210 may compare the information provided in the new rule construct and the network device information associated with network devices 220 to which the new rule is to be provided. Based on the comparison of the information provided in the new rule construct and the network device information, controller device 210 may determine a proper position for the new rule in each of network devices 220 to which the new rule is to be provided.

In some implementations, controller device 210 may determine a proper position for the new rule in each of network devices 220, as described below in connection with FIG. 7. In some implementations, controller device 210 may also ensure that the new rule does not conflict with existing rules stored on network devices 220 to which the new rule is to be provided.

As further shown in FIG. 5, process 500 may include causing the new rule to be provided to and stored in the network devices at the proper position in each of the network devices (block 540). For example, controller device 210 may cause the new rule to be provided to and stored in network devices 220 (e.g., to which the new rule is to be provided, as determined by controller device 210) at the proper position in each of network devices 220. In some implementations, controller device 210 may provide the new rule and an instruction to network devices 220 to which the new rule is to be provided. The instruction may include information instructing each network device 220 to store (e.g., in memory) the new rule at a proper position in a list of existing rules already stored by each network device 220. The instruction may cause each network device 220 to store the new rule at the proper position in the list of existing rules. In some implementations, the instruction may be included with the new rule. In some implementations, controller device 210 may provide the new rule to network devices 220 (to which the new rule is to be provided) at or near the same time (e.g., simultaneously). In some implementations, controller device 210 may provide the new rule to a first set of network devices 220 at a first time, may provide the new rule to a second set of different network devices 220 at a second time different than the first time, etc. Such a staggered provision of the new rule to network devices 220 may conserve resources of controller device 210 and/or bandwidth of network 230.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6A:
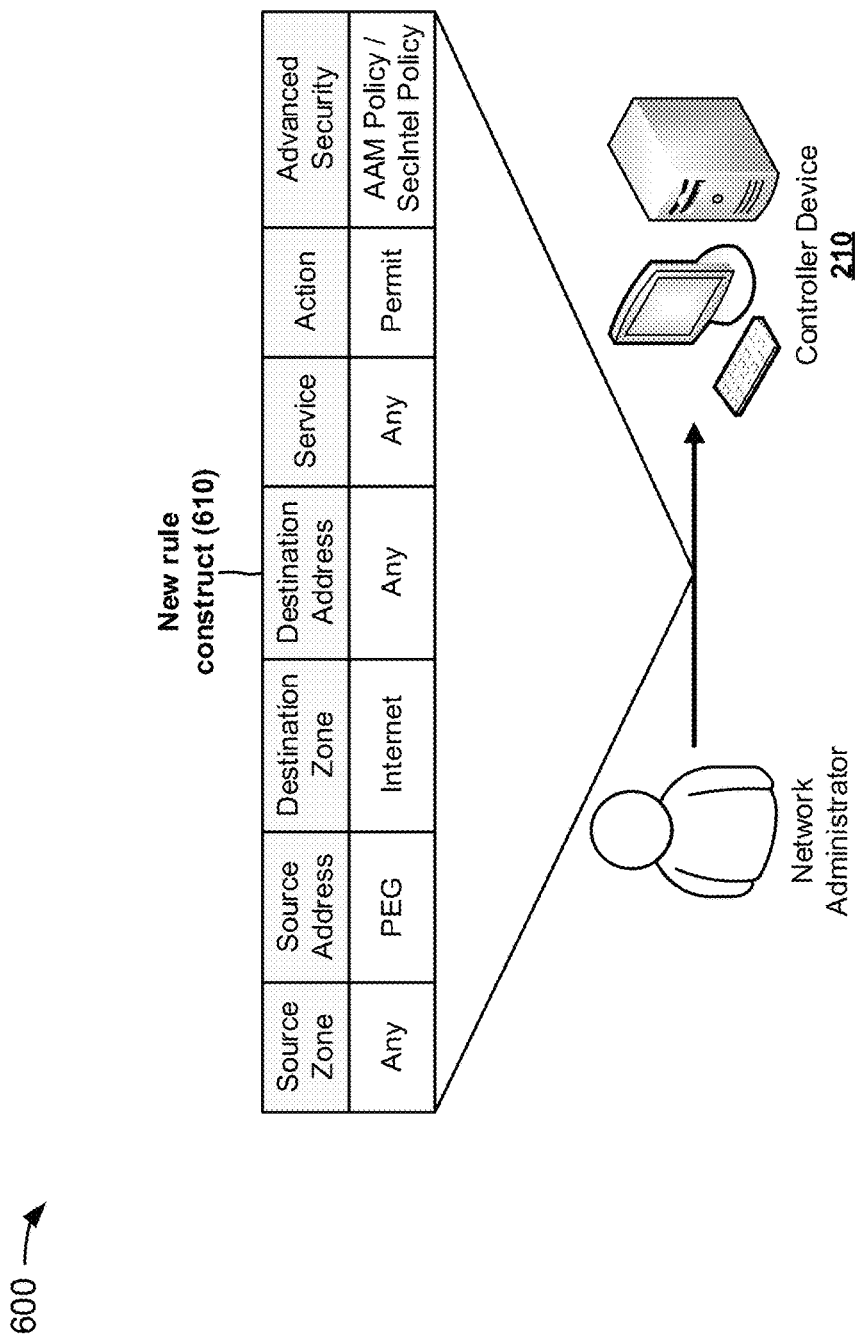
FIGS. 6A-6E are diagrams of an example implementation for causing a new rule to be provided to one or more network devices.

FIGS. 6A-6E are diagrams of an example implementation 600 for causing a new rule to be provided to one or more network devices. As shown in FIG. 6A, assume that a network administrator provides a new rule construct 610 (e.g., associated with a new rule) to controller device 210, and controller device 210 receives new rule construct 610. New rule construct 610 may include a source zone field, a source address field, a destination zone field, a destination address field, a service field, an action field, an advanced security field, and entries associated with each of the fields. The source zone field, the destination address field, and the service field may be designated as "Any," which may indicate that the new rule will apply to packets associated with any source zone, any destination address, and any service. The source address field may be designated as "PEG," which may include a list of IP addresses. The destination zone field may be designated as "Internet," which may indicate that the new rule will apply to packets with the Internet as a destination zone. The action field may be designated as "Permit," which may indicate that the new rule will permit packets, with a PEG as a source address and the Internet as a destination zone, to be forwarded. The advanced security field may be designated as "AAM Policy/SecIntel Policy," which may indicate that the new rule will apply an AAM security policy and a SecIntel security policy to the packets.

Figure 6B:
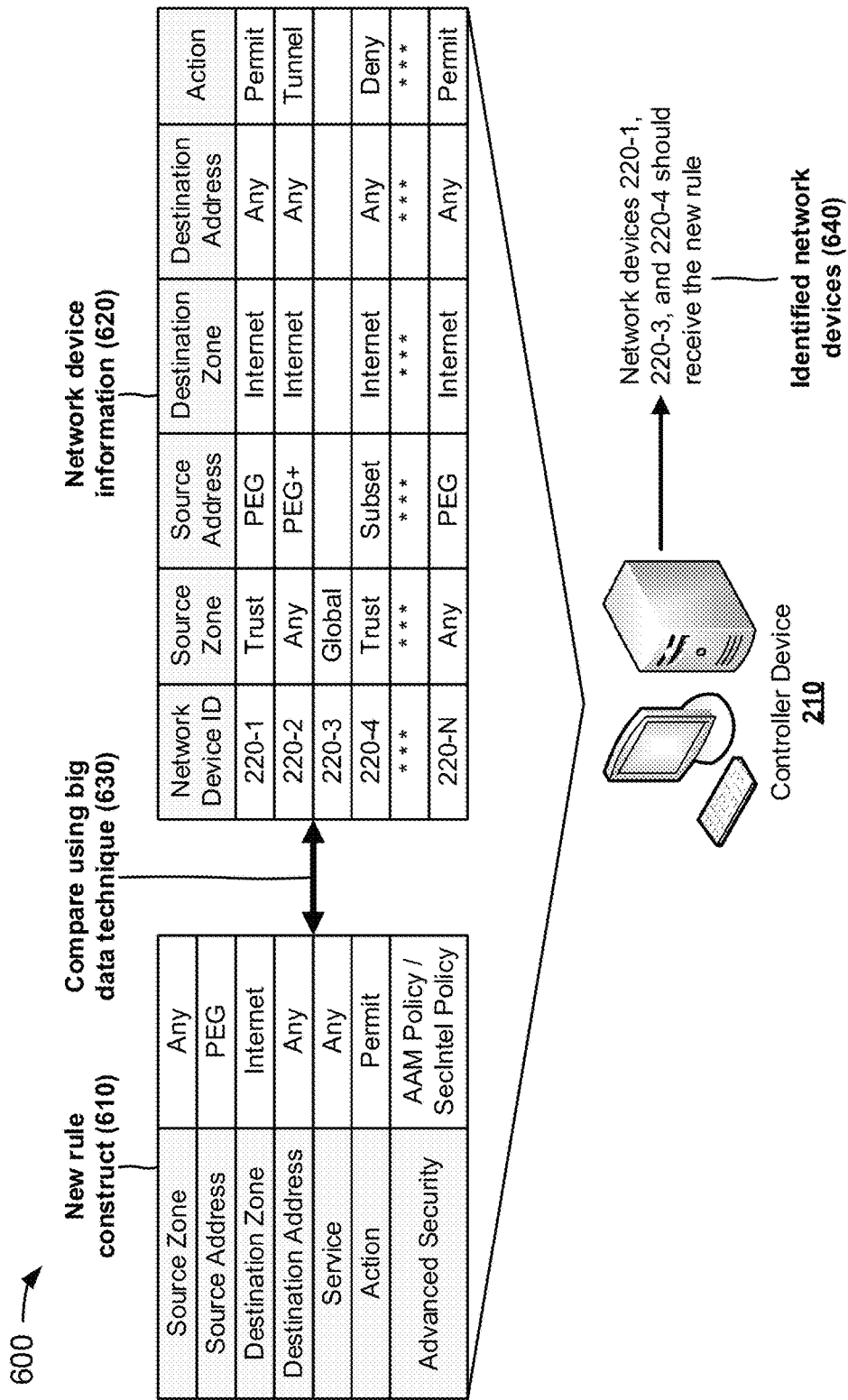

As shown in FIG. 6B, assume that controller device 210 previously receives network device information 620, and stores network device information 620. Network device information 620 may include information associated with network devices 220 of environment 200. For example, network device information 620 may include information identifying network devices 220 (e.g., network addresses of network devices 220), information identifying existing rules stored by network devices 220, or the like. Each of the existing rules may be associated with a source zone field, a source address field, a destination zone field, a destination address field, a service field (not shown in FIG. 6B), an action field, and an advanced security field (not shown in FIG. 6B). Although FIG. 6B depicts one existing rule (in network device information 620) for each network device 220, in practice each network device 220 may be associated with tens, hundreds, thousands, or millions of existing rules.

As further shown in FIG. 6B, controller device 210 may utilize one or more big data techniques (e.g., machine-learning techniques, artificial intelligence techniques, or the like) to compare information provided in new rule construct 610 and network device information 620, as indicated by reference number 630. For example, controller device 210 may compare the existing rules with the new rule to determine whether network devices 220 require the new rule. Based on the comparison of the information provided in new rule construct 610 and network device information 620, controller device 210 may identify network devices 220 to which the new rule is to be provided, as indicated by reference number 640. For example, assume that, based on the comparison, controller device 210 identifies network devices 220-1, 220-3, and 220-4 as network devices 220 to which the new rule is to be provided. Further, assume that network device 220-1 includes existing rules provided in a first particular order (e.g., Rule 1, Rule 4, and Rule 6), network device 220-3 includes existing rules provided in a second particular order (e.g., Rule 2 and Rule 3), and network device 220-4 includes one existing rule (e.g., Rule 5).

Figure 6C:
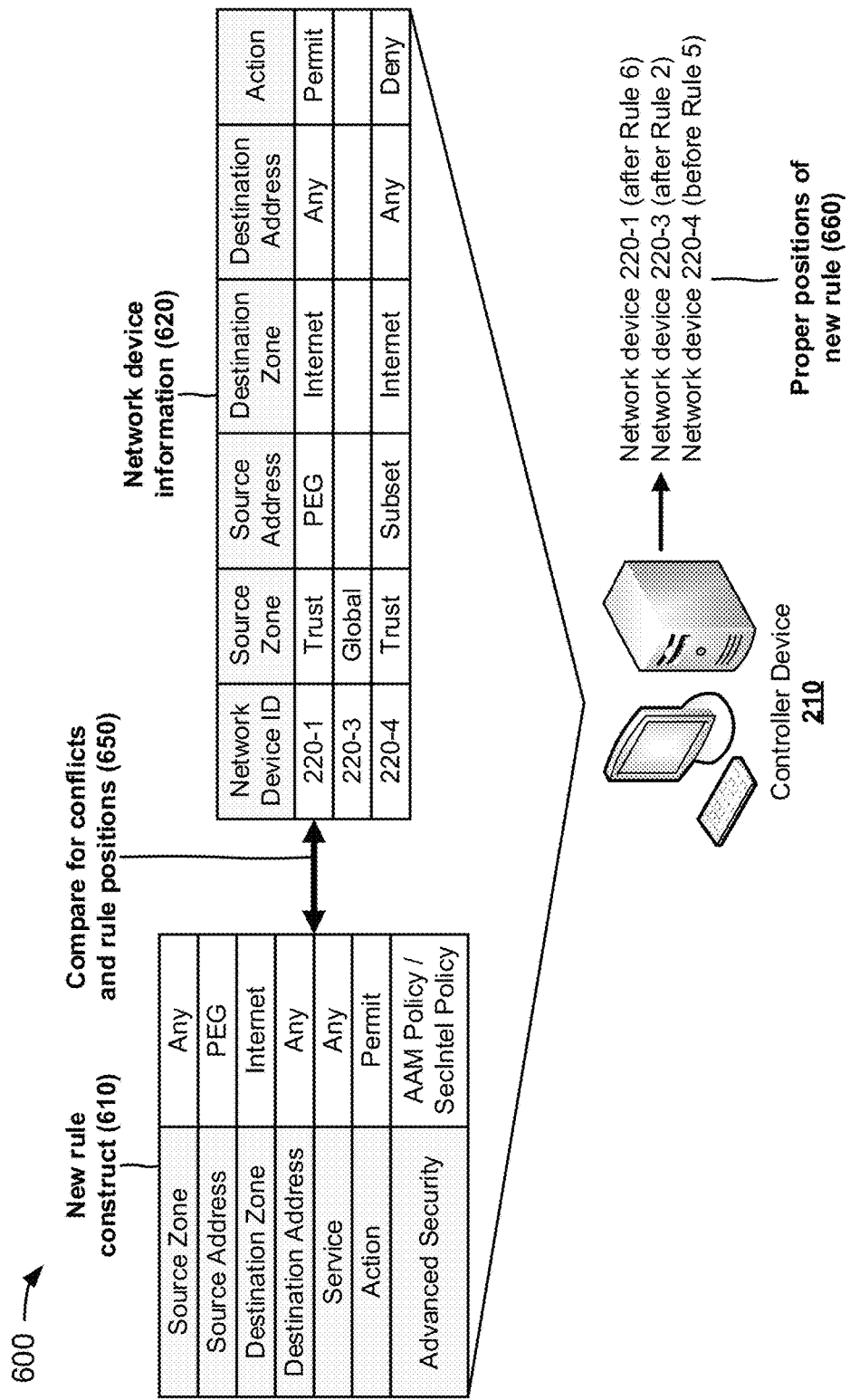

As indicated by reference number 650 in FIG. 6C, controller device 210 may compare information provided in new rule construct 610 and network device information 620, associated with the identified network devices 220 (e.g., network devices 220-1, 220-3, and 220-4) to determine whether the new rule conflicts with existing rules of the identified network devices 220 and to determine proper positions for the new rule in the list of existing rules of the identified network devices 220. Assume that controller device 210 determines that the new rule does not conflict with the existing rules of the identified network devices 220. Further, assume that controller device 210 determines that the new rule is to be positioned after Rule 6 in network device 220-1, after Rule 2 in network device 220-3, and before Rule 5 in network device 220-4, as indicated by reference number 660.

Figure 6D:
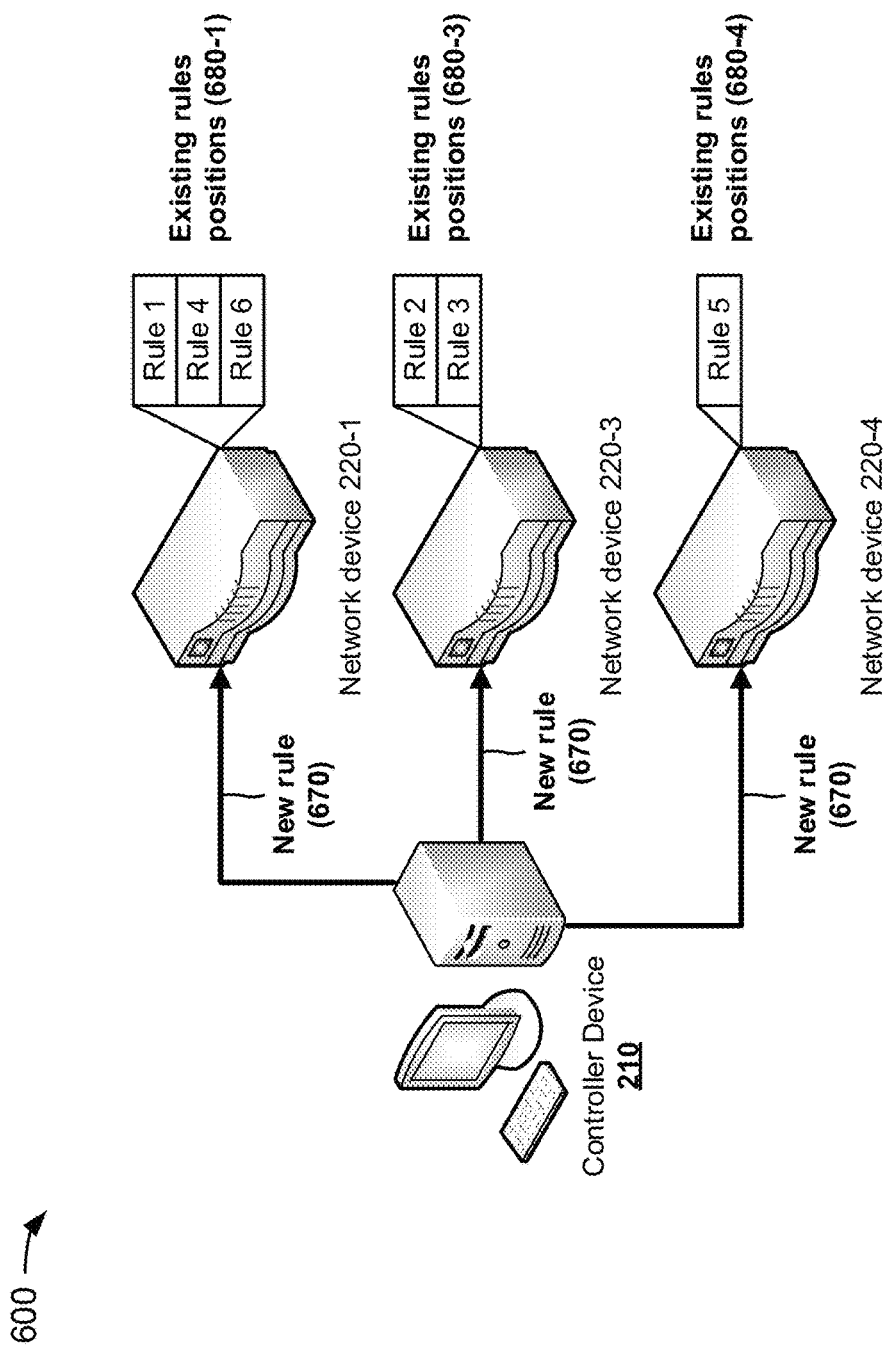

As shown in FIG. 6D, controller device 210 may provide the new rule to network devices 220-1, 220-3, and 220-4, as indicated by reference number 670, and network devices 220-1, 220-3, and 220-4 may receive the new rule. As further shown, network device 220-1 may store (e.g., in memory) existing rules in a first particular order (e.g., Rule 1, Rule 4, and Rule 6), as indicated by reference number 680-1. Network device 220-3 may store (e.g., in memory) existing rules in a second particular order (e.g., Rule 2 and Rule 3), as indicated by reference number 680-3. Network device 220-4 may store (e.g., in memory) one existing rule (e.g., Rule 5), as indicated by reference number 680-4. In some implementations, the new rule may include information instructing network devices 220-1, 220-3, and 220-4 to store the new rule at the proper positions among the existing rules of network devices 220-1, 220-3, and 220-4.

Figure 6E:
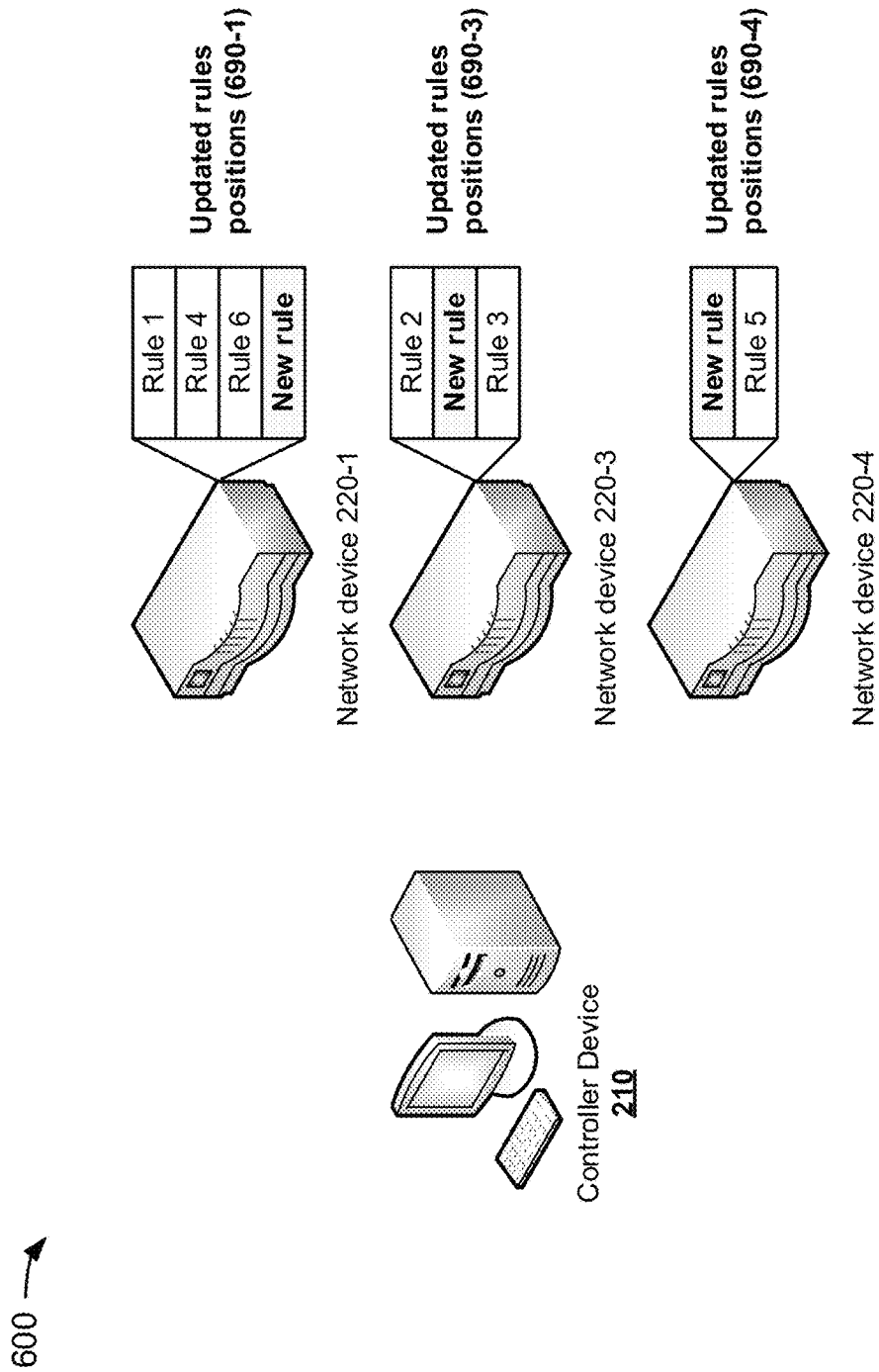

As shown in FIG. 6E, network devices 220-1, 220-3, and 220-4 may store the new rule at the proper positions among the existing rules of network devices 220-1, 220-3, and 220-4. For example, as shown in FIG. 6E, network device 220-1 may store the new rule after Rule 6, creating updated rules positions 690-1. Network device 220-3 may store the new rule between Rule 2 and Rule 3, creating updated rules positions 690-3. Network device 220-4 may store the new rule prior to Rule 5, creating updated rules positions 690-4. In some implementations, network devices 220-1, 220-3, and 220-4 may provide, to controller device 210, a message indicating that the new rule has been successfully stored, or a message indicating that the new rule has not been successfully stored. As a result of storing the new rule in the proper positions, network devices 220-1, 220-3, and 220-4 improve their operations and increase security in the network.

As indicated above, FIGS. 6A-6E are provided merely as an example. Other examples are possible and may differ from what was described with regard to FIGS. 6A-6E. In some implementations, the various operations described in connection with FIGS. 6A-6E may be performed automatically (without user input) or at the request of a user.

Figure 7:
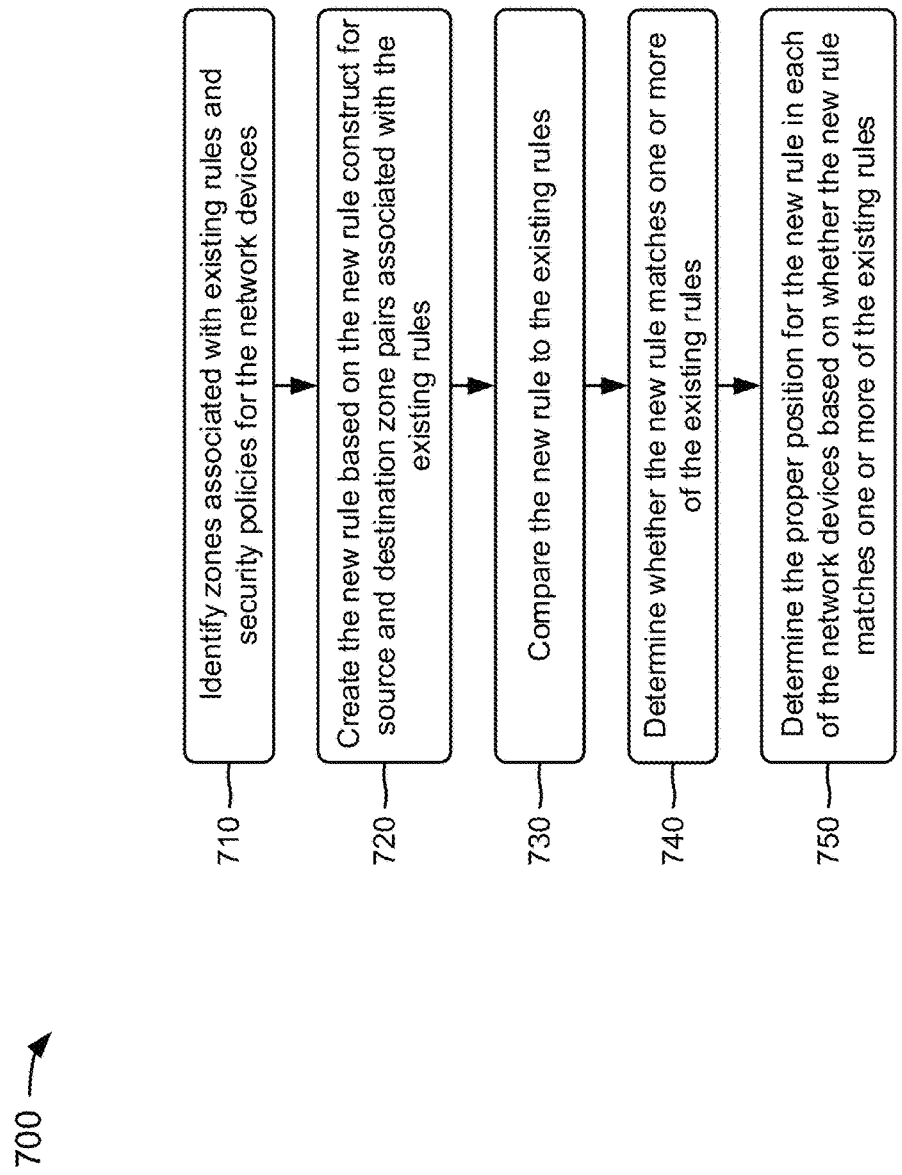
FIG. 7 is a flow chart of an example process for determining proper positions for a new rule within one or more network devices.

FIG. 7 is a flow chart of an example process 700 for determining proper positions for a new rule within one or more network devices. In some implementations, process 700 may correspond to process block 530 of FIG. 5. In some implementations, one or more process blocks of FIG. 7 may be performed by controller device 210. In some implementations, one or more process blocks of FIG. 7 may be performed by another device or a group of devices separate from or including controller device 210, such as network device 220.

As shown in FIG. 7, process 700 may include identifying zones associated with existing rules and security policies for the network devices (block 710). For example, controller device 210 may identify (e.g., in network device information 620, FIG. 6) zones associated with existing rules and security policies for network devices 220 to which the new rule is to be provided. In some implementations, each zone may include a grouping of interfaces that are similar from a security perspective. For example, some network devices 220 may be associated with a zone that provides a first level of security (e.g., high level security for a government network), some network devices 220 may be associated with a zone that provides a second level of security less than the first level of security (e.g., low level security for a university network), or the like. In some implementations, controller device 210 may utilize one or more big data techniques described herein to identify (e.g., in network device information 620) zones associated with existing rules and security policies for network devices 220 to which the new rule is to be provided.

As further shown in FIG. 7, process 700 may include creating the new rule based on the new rule construct for source and destination zone pairs associated with the existing rules (block 720). For example, controller device 210 may create the new rule based on the new rule construct for source and destination zone pairs associated with the existing rules for network devices 220 to which the new rule is to be provided. In some implementations, controller device 210 may identify (e.g., in network device information 620) a zone pair (e.g., a combination of a source zone and a destination zone) for each of the existing rules. In some implementations, controller device 210 may utilize one or more big data techniques described herein to identify the zone pairs for the existing rules. In some implementations, controller device 210 may create the new rule based on the new rule construct for the identified zone pairs associated with the existing rules for network devices 220 to which the new rule is to be provided.

As further shown in FIG. 7, process 700 may include comparing the new rule to the existing rules (block 730). For example, controller device 210 may compare the new rule to the existing rules for network devices 220 to which the new rule is to be provided. In some implementations, controller device 210 may compare the new rule to all the existing rules within the zone pair context. In some implementations, controller device 210 may utilize one or more big data techniques described herein to compare the new rule to the existing rules for network devices 220 to which the new rule is to be provided. In some implementations, controller device 210 may compare one or more fields (e.g., the source zone field, the source address field, the destination zone field, the destination address field, the service field, the action field, and/or the advanced security field) of the new rule construct with one or more fields of the existing rules (e.g., as shown in network device information 620, FIG. 6).

As further shown in FIG. 7, process 700 may include determining whether the new rule matches one or more of the existing rules (block 740). For example, controller device 210 may determine whether the new rule matches one or more of the existing rules for network devices 220 to which the new rule is to be provided. In some implementations, controller device 210 may determine that the new rule matches an existing rule when a particular number of fields or parameters (e.g., Layer 4 (L4) parameters, such as the source zone field, the source address field, the destination zone field, the destination address field, the service field, the action field, and/or the advanced security field) for the new rule matches the particular number of parameters of the existing rule. For example, controller device 210 may determine that the new rule matches an existing rule when five parameters (e.g., five L4 parameters, such as the source zone field, the destination zone field, the source address field, the destination address field, and the action field) for the new rule matches the same five parameters of the existing rule.

As further shown in FIG. 7, process 700 may include determining the proper position for the new rule in each of the network devices based on whether the new rule matches one or more of the existing rules (block 750). For example, controller device 210 may determine the proper position for the new rule in each of network devices 220 (to which the new rule is to be provided) based on whether the new rule matches one or more of the existing rules. In some implementations, if controller device 210 determines that the new rule is a subset (e.g., that some but not all of the parameters match) or an exact match (e.g., that all of the parameters match) of an existing rule, controller device 210 may cause network devices 220 to place the new rule before the matched existing rule. In some implementations, if controller device 210 determines that the new rule is a super set (e.g., some of the parameters of the new rule match all of the parameters of the existing rule) of an existing rule, controller device 210 may copy the parameters (e.g., the L4 parameters) from the matched existing rule to the new rule, and may place the new rule before the matched existing rule in the list of rules.

In some implementations, if controller device 210 determines that the new rule partially matches an existing rule, controller device 210 may copy a common set of values from the partially matched existing rule to the new rule, and may place the new rule before the partially matched existing rule in the list of rules. In some implementations, controller device 210 may create a global catch all rule (e.g., with "Any" as a source address and "Any" as a destination address) if there is no existing global catch all rule with the same set of values in the L4 parameters. In some implementations, while matching the rules, if an existing rule has an action field set to "Deny" and the remaining parameters (e.g., the remaining L4 parameters) match, controller device 210 may not create a new rule with a "Permit" action since such a rule may allow traffic rather than block the traffic (i.e., may contradict the existing rule).

The following provides examples of rule placement (e.g., identifying a proper position for a rule), by controller device 210, for different scenarios. A first example scenario relates to policy enforcement after match criteria. For example, assume that the following is a new rule construct provided to controller device 210:

| Source Zone | Source Address | Destination Zone | Destination Address | Service | Action | Advanced Security |
|---|---|---|---|---|---|---|
| Any | PEG | Internet | Any | Any | Permit | AAM Policy/SecIntel Policy |

In such an example, controller device 210 may identify zones used in the policies associated with network devices 220. If an "Internet" zone is identified, controller device 210 may execute a policy analysis with a source zone designated for each identified zone. If an "Internet" zone is not identified, controller device 210 may execute a policy analysis in a device context for each zone pair rule by selecting two zones from the identified zones.

In some implementations, if the new rule is an exact match, a subset match, a superset match, or a partial match of an existing rule, but an action field of the existing rule is designated "Deny" or "Reject," controller device 210 may not place the new rule before the existing rule in the list of rules.

In some implementations, if the new rule is an exact match or a subset of an existing rule and the action field of the existing rule is designated "Permit/Tunnel," controller device 210 may place the new rule just before the existing rule in the list of rules, and may create a global rule with a source zone designated as "Any." For example, controller device 210 may create the following list of rules:

| Source Zone | Source Address | Destination Zone | Destination Address | Service | Action | Advanced Security |
|---|---|---|---|---|---|---|
| Trust | PEG | Internet | Any | Any | Permit | AAM Policy/SecIntel Policy |
| Trust | PEG + extra | Internet | Any | Any | Permit/ Tunnel | |
| Global | | | | | | |
| Any | PEG | Internet | Any | Any | Permit | AAM Policy/SecIntel Policy |

In some implementations, if the new rule is a superset of an existing rule and the action field of the existing rule is designated "Permit/Tunnel," controller device 210 may create a new rule, and place the new rule above the existing rule in the list of rules, by taking an intersection of the parameters, and may create a global rule with a source zone designated as "Any." For example, controller device 210 may create the following list of rules:

In this example scenario, controller device 210 may utilize the same strategy of determining the zone pairs, and executing a policy analysis based on the created DAG address and a GeoIP address. Controller device 210 may also utilize the same rule creation logic as described above in the first example scenario.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

| Source Zone | Source Address | Destination Zone | Destination Address | Service | Action | Advanced Security |
|---|---|---|---|---|---|---|
| Trust | Subset PEG | Internet | Any | Any | Permit | AAM Policy/ SecIntel Policy |
| Trust | Subset PEG | Internet | Any | Any | Permit/ Tunnel | |
| Global | | | | | | |
| Any | PEG | Internet | Any | Any | Permit | AAM Policy/ SecIntel Policy |

In some implementations, if some fields of the new rule (e.g., a source address) are a superset of an existing rule, but another field of the new rule (e.g., a source zone) is a subset of the existing rule, controller device 210 may create a new rule by taking an intersection of the fields, may place the new rule in the list of rules, and may create a global rule with a source zone designated as "Any." For example, controller device 210 may create the following list of rules:

| Source Zone | Source Address | Destination Zone | Destination Address | Service | Action | Advanced Security |
|---|---|---|---|---|---|---|
| Global | | | | | | |
| Trust | Subset PEG | Internet | Any | Any | Permit | AM Policy/ SecIntel Policy |
| Trust + untrust | Subset PEG | Internet | Any | Any | Permit/ Tunnel | |
| Any | PEG | Internet | Any | Any | Permit | AAM Policy/ SecIntel Policy |

A second example scenario relates to a policy enforced through match criteria. For example, in this example scenario, controller device 210 may utilize geolocation IP (GeoIP) addresses (e.g., that identify geographic locations of network devices 220 based on IP addresses of network devices 220) and dynamic address groups (DAGs) with a threat management policy. Controller device 210 may create a DAG address, and may use the created DAG address in a new rule. In one example, controller device 210 may create the following list of rules:

| Source Zone | Source Address | Destination Zone | Destination Address | Service | Action |
|---|---|---|---|---|---|
| Any | PEG | Internet | DAG | Any | <selected Action> |
| Internet | DAG | Any | PEG | Any | <selected Action> |

Implementations, described herein, may provide a controller device that automatically analyzes existing firewall rules associated with multiple network devices, causes a new firewall rule to be stored at a proper position within a list of firewall rules, in the multiple network devices, based on the analysis of the existing firewall rules, and creates an intent-based firewall policy. The controller device may determine proper positions for new firewall rules more quickly than typical systems that do not use the controller device, which may conserve computing resources of the controller device, as well as computing resources of the multiple network devices.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
    receive a new rule construct that includes a source address, a destination address, and one or more parameters,
        the new rule construct including a new rule to be provided to a network with a plurality of network devices;
    identify a set of network devices, of the plurality of network devices, to which the new rule is to be provided based on the new rule construct;
    determine whether information provided in the new rule construct matches information associated with existing rules in a list of existing rules associated with each network device of the set of network devices,
        the information provided in the new rule construct including at least one of:
            data identifying a source zone,
            the source address,
            data identifying a destination zone,
            the destination address,
            service data identifying network packet service information,
            action data identifying an action to be performed on network traffic, or
            advanced security data identifying one or more security policies to be applied to the network traffic;
    determine a proper position for the new rule, in the list of existing rules associated with each network device of the set of network devices, based on whether the information provided in the new rule construct matches the information associated with the existing rules; and
    cause the new rule to be provided to and stored in the set of network devices at the proper position, in the list of existing rules, determined for each network device of the set of network devices.

2. The device of claim 1, where the one or more processors are further to:
provide an instruction with the new rule to the set of network devices,
    the instruction causing each network device of the set of network devices to store the new rule at the proper position in the list of existing rules.

3. The device of claim 1, where the one or more processors, when determining whether the information provided in the new rule construct matches the information associated with the existing rules in the list of existing rules, are further to:
    determine that the information provided in the new rule construct matches the information associated with an existing rule, of the existing rules; and
    determine that the proper position for the new rule is before the existing rule based on determining that the information provided in the new rule construct matches the information associated with the existing rule.

4. The device of claim 1, where the one or more processors are further to:
    identify source and destination zone pairs associated with the existing rules; and
    create the new rule, based on the new rule construct, for the source and destination zone pairs associated with the existing rules.

5. The device of claim 1, where the one or more processors identify the set of network devices based on one or more of:
    a machine learning technique,
    an artificial intelligence technique,
    a data mining technique,
    a modeling technique, or
    a neural network technique.

6. The device of claim 1, where the one or more parameters include information associated with one or more of:
    a threat management policy,
    a denial of service policy,
    a network address translation (NAT) policy,
    a quality of service (QoS) policy,
    a decryption policy, or
    an application override policy.

7. A non-transitory computer-readable medium storing instructions, the instructions comprising:
one or more instructions that, when executed by one or more processors, cause the one or more processors to:
    receive a new rule construct that includes a source address or a destination address, and at least one parameter,
        the new rule construct including a new rule to be provided to a network;
    identify a plurality of network devices, of the network, to which the new rule is to be provided based on the new rule construct;
    determine whether information provided in the new rule construct matches information associated with existing rules in a list of existing rules associated with each network device of the plurality of network devices, the information provided in the new rule construct
including at least one of:
data identifying a source zone,
the source address,
data identifying a destination zone,
the destination address,
service data identifying network packet service information,
action data identifying an action to be performed on network traffic, or
advanced security data identifying one or more security policies to be applied to the network traffic;
determine a proper position for the new rule, in the list of existing rules associated with each network device of the plurality of network devices, based on whether the information provided in the new rule construct matches the information associated with the existing rules; and
cause the new rule to be provided to and stored by the plurality of network devices at the proper position, in the list of existing rules, determined for each network device of the plurality of network devices.

8. The non-transitory computer-readable medium of claim 7, where the instructions further comprise:
one or more instructions that, when executed by the one or more processors, cause the one or more processors to:
provide an instruction with the new rule to the plurality of network devices,
the instruction to cause each network device of the plurality of network devices to store the new rule at the proper position in the list of existing rules.

9. The non-transitory computer-readable medium of claim 7, where the one or more instructions that cause the one or more processors to determine whether the information provided in the new rule construct matches the information associated with the existing rules in the list of existing rules, further
cause the one or more processors to:
determine that the information provided in the new rule construct matches the information associated with an existing rule, of the existing rules; and
determine that the proper position for the new rule is before the existing rule based on determining that the information provided in the new rule construct matches the information associated with the existing rule.

10. The non-transitory computer-readable medium of claim 7, where the one or more instructions that cause the one or more processors to determine whether the information provided in the new rule construct matches information associated with the existing rules in the list of existing rules, further
cause the one or more processors to:
determine that the information provided in the new rule construct does not match the information associated with an existing rule, of the existing rules; and
determine that the proper position for the new rule is after the existing rule based on determining that the information provided in the new rule construct does not match the information associated with the existing rule.

11. The non-transitory computer-readable medium of claim 7, where the instructions further comprise:
one or more instructions that, when executed by the one or more processors, cause the one or more processors to:
identify source and destination zone pairs associated with the existing rules; and
create the new rule, based on the new rule construct, for the source and destination zone pairs associated with the existing rules.

12. The non-transitory computer-readable medium of claim 7, where the plurality of network devices are identified based on one or more of:
a machine learning technique,
an artificial intelligence technique,
a data mining technique,
a modeling technique, or
a neural network technique.

13. A method, comprising:
receiving, by a device, a new rule construct that includes a source address or a destination address, and at least one parameter,
the new rule construct including a new rule to be provided to a network;
identifying, by the device, a plurality of network devices, of the network, to which the new rule is to be provided based on the new rule construct;
determining, by the device, whether information provided in the new rule construct matches information associated with an existing rule in a list of existing rules associated with a network device of the plurality of network devices,
the information provided in the new rule construct including at least one of:
data identifying a source zone,
the source address,
data identifying a destination zone,
the destination address,
service data identifying network packet service information,
action data identifying an action to be performed on network traffic, or
advanced security data identifying one or more security policies to be applied to the network traffic;
determining, by the device, a proper position for the new rule, in the list of existing rules, based on whether the information provided in the new rule construct matches the information associated with the existing rule; and
causing, by the device, the new rule to be provided to and stored by the network device, at the proper position, in the list of existing rules, determined for the network device.

14. The method of claim 13, further comprising:
providing an instruction with the new rule to the plurality of network devices,
the instruction to cause each network device of the plurality of network devices to store the new rule at the proper position in respective lists of existing rules.

15. The method of claim 13, wherein determining whether the information provided in the new rule construct matches the information associated with the existing rule in the list of existing rules comprises:
determining that the information provided in the new rule construct matches the information associated with the existing rule; and
determining that the proper position for the new rule is before the existing rule based on determining that the information provided in the new rule construct matches the information associated with the existing rule.

16. The method of claim 13, wherein determining whether the information provided in the new rule construct matches the information associated with the existing rule in the list of existing rules comprises:
 determining that the information provided in the new rule construct does not match the information associated with the existing rule; and
 determining that the proper position for the new rule is after the existing rule based on determining that the information provided in the new rule construct does not match the information associated with the existing rule.

17. The method of claim 13, further comprising:
 identifying source and destination zone pairs associated with at least one existing rule in the list of existing rules associated with the network device; and
 creating the new rule, based on the new rule construct, for the source and destination zone pairs associated with the at least one existing rule.

18. The method of claim 13, wherein determining whether the information provided in the new rule construct matches the information associated with the existing rule comprises:
 determining that the information provided in the new rule construct matches the information associated with the existing rule based on a plurality of fields of the new rule construct including first information, of the information provided in the new rule construct, that matches second information stored in a corresponding second plurality of fields associated with the existing rule.

19. The device of claim 1, where the one or more processors, when determining whether the information provided in the new rule construct matches the information associated with the existing rules, are further to:
 determine that the information provided in the new rule construct matches the information associated with the existing rule based on a plurality of fields of the new rule construct including first information, of the information provided in the new rule construct, that matches second information stored in a corresponding second plurality of fields associated with the existing rule.

20. The non-transitory computer-readable medium of claim 7, where the one or more instructions that cause the one or more processors to determine whether the information provided in the new rule construct matches the information associated with the existing rules, are further to:
 determine that the information provided in the new rule construct matches the information associated with the existing rule based on a plurality of fields of the new rule construct including first information, of the information provided in the new rule construct, that matches second information stored in a corresponding second plurality of fields associated with the existing rule.

* * * * *